United States Patent [19]

Durr et al.

[11] Patent Number: 4,954,222

[45] Date of Patent: Sep. 4, 1990

[54] DRY CLEANING SOLVENT FILTRATION AND RECOVERY SYSTEM WITH FILTER RINSING APPARATUS

[76] Inventors: Larry L. Durr, 9102 Grinnell, Indianapolis, Ind. 46268; B. Jan Clay, 7650 Eagle Valley Pass, Indianapolis, Ind. 46224; Larry J. Durr, 5210 Kathcart Way, Indianapolis, Ind. 46254

[21] Appl. No.: 273,261

[22] Filed: Nov. 18, 1988

[51] Int. Cl.$^5$ .................... B01D 3/38; B01D 36/00
[52] U.S. Cl. .................... 202/176; 202/170; 202/202; 202/204; 202/234; 68/18 R; 68/18 F; 134/10; 134/12; 134/109; 134/110; 203/39; 203/97; 203/DIG. 16; 210/106; 210/132; 210/167; 210/253; 210/295; 210/332; 210/409; 210/490
[58] Field of Search ............... 210/253, 167, 409, 490, 210/106, 132, 295, 332; 68/18 F, 18 C, 18 R; 134/109, 110, 111, 10, 12; 202/202, 163, 170, 178, 169, 168, 176, 197, 204, 234; 203/DIG. 16, 95-97, 39

[56] References Cited

U.S. PATENT DOCUMENTS

| | | | |
|---|---|---|---|
| 2,359,138 | 9/1944 | Martin | 210/167 |
| 3,222,896 | 12/1965 | Schneider | 68/18 R |
| 3,326,383 | 6/1967 | Pranovi | 210/167 |
| 3,344,923 | 10/1967 | Pall et al. | 210/132 |
| 3,357,567 | 12/1967 | Wake | . |
| 3,421,835 | 1/1969 | McCarty | 210/167 |
| 3,508,422 | 4/1970 | Landon | 210/167 |
| 3,665,547 | 5/1972 | Boylan | 15/406 |
| 3,692,467 | 9/1972 | Durr et al. | . |
| 3,704,573 | 12/1972 | Koller et al. | 68/18 F |
| 3,765,840 | 10/1973 | Durr et al. | . |
| 3,794,169 | 2/1974 | Sisk et al. | . |
| 4,036,701 | 7/1977 | Clay et al. | 202/204 |
| 4,175,932 | 11/1979 | Durr et al. | 55/59 |
| 4,299,665 | 11/1981 | Clay et al. | 202/204 |
| 4,513,590 | 4/1985 | Fine | 210/409 |
| 4,624,785 | 11/1986 | Drori | . |
| 4,770,793 | 9/1988 | Teffry-Goatley et al. | . |
| 4,834,883 | 5/1989 | Lake | 210/409 |

FOREIGN PATENT DOCUMENTS

| | | | |
|---|---|---|---|
| 628493 | 4/1936 | Fed. Rep. of Germany | 210/409 |
| 2541909 | 9/1984 | France | 210/106 |

OTHER PUBLICATIONS

*Solvent Recovery for Compliance with Federal Regulations,* Larry J. Durr and Ellen Rawlins, reprinted from Plating and Surface Finishing, Oct. 1981.

*Primary Examiner*—Wilbur Bascomb
*Attorney, Agent, or Firm*—Woodard, Emhardt, Naughton, Moriarty & McNett

[57] ABSTRACT

A dry cleaning solvent recovery and filtering system includes a dry cleaning solvent tank containing solvent for use in a dry cleaning machine. A filtration path from the tank includes a centrifugal separator for removing coarse debris and a filter element for removing fine debris from the solvent fluid. The filter element includes a perforated metal cylinder, having an open mouth, with a Teflon® coated screen forming the interior debris collection surface. A rinsing spray nozzle situated at the mouth of the filter element directs a fluid spray under pressure against the collection surface in the same direction that debris contaminated solvent fluid flows therethrough. The pressure of the fluid spray is sufficient to dislodge fine debris adhered to the collection surface without forcing the debris into the perforations of the filter element.

13 Claims, 3 Drawing Sheets

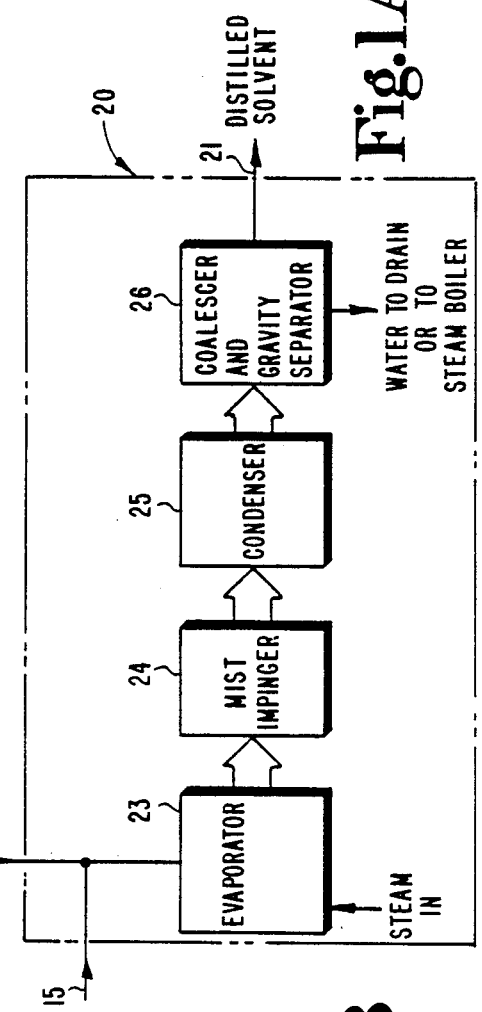
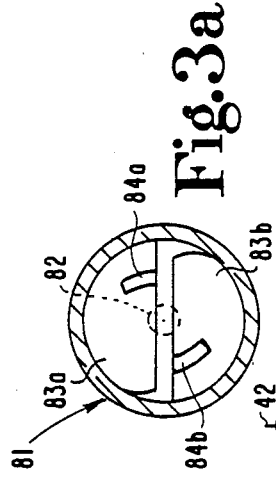
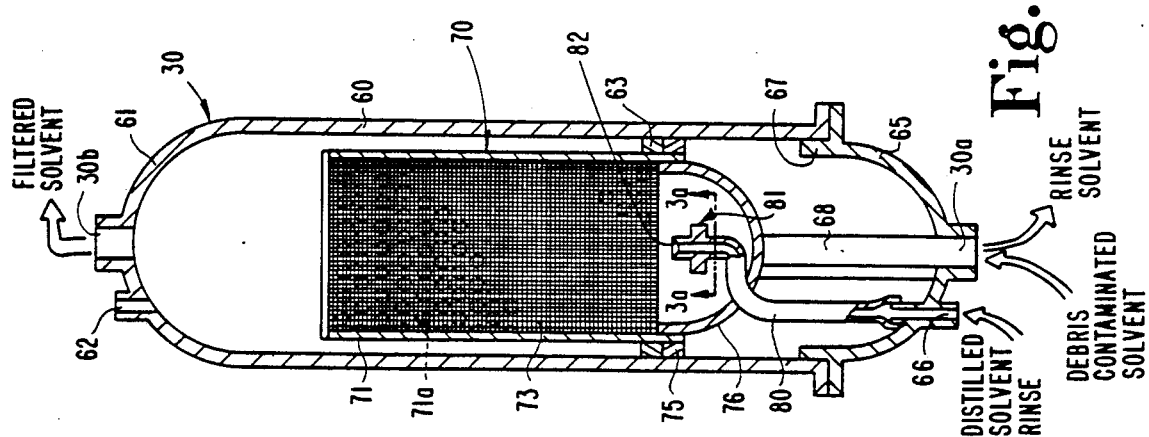

DRY CLEANING SOLVENT FILTRATION AND RECOVERY SYSTEM WITH FILTER RINSING APPARATUS

BACKGROUND OF THE INVENTION

This invention relates to systems for the purification and recovery of industrial solvents, such as solvents used in dry cleaning or textile treating processes. More particularly, the invention concerns filtration of a contaminated solvent, and a device for rinsing or cleansing the filter element.

Recent emphasis on the environmental hazards of industrial solvents has led to the development of systems for the recovery and reuse of the solvents. In the laundry and dry cleaning industry industrial solvents, such as perchlorethylene, are used. The perchlorethylene is frequently augmented with surface active chemicals, or surfactants, to enhance the textile cleaning capability.

In a typical dry cleaning facility, the solvent solution is fed into a dry cleaning tumbler during the cleaning cycle. After the dry cleaning cycle is complete, contaminated solvent fluid is discharged from the tumbler for recovery or recycling. The contaminated solvent fluid contains dirt, lint, and other residue or debris, as well as any surfactants and other non-biodegradable chemicals. In the prior art, replaceable filter cartridges, composed of pleated paper and a carbon core, have been used to filter the contaminated dry cleaning solvent. One difficulty with the replaceable cartridge is that the paper and carbon become saturated with hazardous waste that must ultimately be disposed of in compliance with environmental regulations.

More recently, the replaceable filter cartridge has been replaced by the more efficient distillation process for recycling contaminated perchlorethylene solvent. Reclamation by distillation is preferable over other techniques because it reduces the amount of hazardous waste generated by the process that must ultimately be disposed of in accordance with environmental regulations.

One drawback of the distillation technique is that it is relatively inconvenient and expensive to do in a continuous batch mode. Consequently, in many dry cleaning solvent reclamation systems, only a small percentage of the solvent within the system is passed through the distillation process.

Because the distillation apparatus eliminates the need for the replaceable carbon core filter cartridges, a chemical filter is no longer required. However, since the solvent fluid is not continuously distilled, filters are used to eliminate residue or debris from the contaminated solvent fluid. In one such apparatus, a stainless steel filter element is situated in a recovery loop to capture the debris suspended in the contaminated dry cleaning solvent fluid. Through continued use, the filter element becomes encased in the debris so that back pressure in the filter increases and the amount of dry cleaning solvent being recycled is reduced. In order to prevent this reduction in solvent flow, the filter element in prior art devices is cleaned using a backwash technique in which fluid is flowed through the filter in a direction opposite to the normal filtering direction. The debris is dislodged from the surface of the filter and collected for later disposal.

Backwashing techniques generally require a high volume of fluid in order to completely clean the filter element. Moreover, backwashing has a tendency to collapse cylindrical filters, unless a stiffer, more expensive, filter element is used that will not collapse under the moderate backwashing pressures. There is a need, particularly in the field of dry cleaning solvent recovery, for a filter rinsing or cleansing device that utilizes a low volume of fluid to completely rinse the filter element of adhered residue, without the risk of collapsing the filter element during the rinsing cycle.

BRIEF DESCRIPTION OF THE DRAWINGS

FIG. 1a is a detailed schematic of the steam distillation apparatus used in the system illustrated in FIG. 1.

FIG. 3 is a cross-sectional view of the filter shown in FIGS. 1 and 2, including the filter element and the filter rinse nozzle.

FIG. 3a is an enlarged bottom view of the filter rinse nozzle for the preferred embodiment, taken along line 3a—3a in FIG. 3 as viewed in the direction of the arrows.

DESCRIPTION OF THE PREFERRED EMBODIMENT

Figure 1:
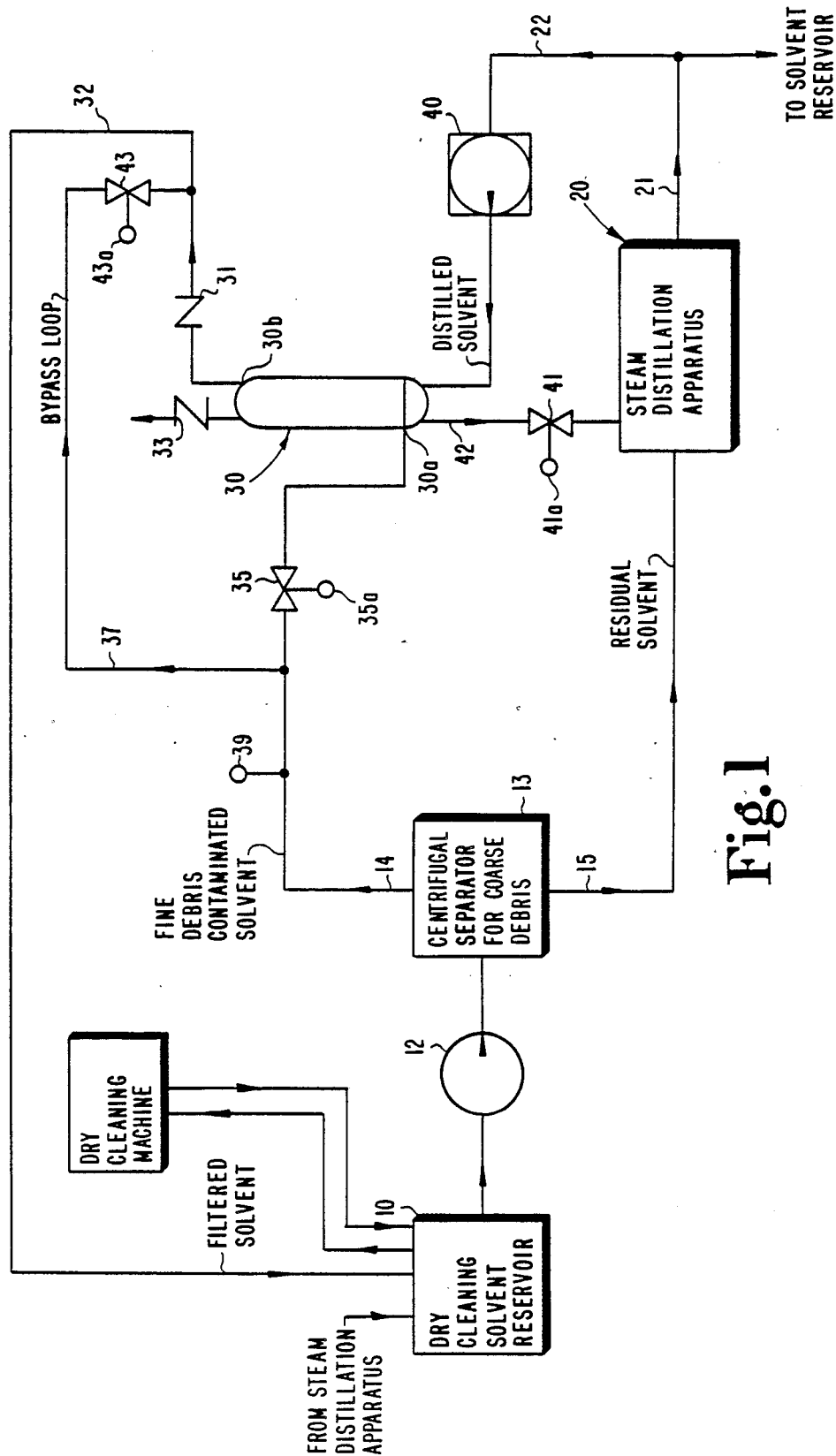
FIG. 1 is a diagram of a system which embodies the invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, the solvent recovery and filtration system of one embodiment of the invention includes a dry cleaning solvent reservoir 10 such as is used in connection with a dry cleaning machine, such as a dry cleaning tumbler. In many dry cleaning processes, solvent is fed from the reservoir to the dry cleaning machine and then returned to the solvent reservoir 10 for purification. The solvent is preferrably perchlorethylene, but may also be any other essentially water immiscible solvent suitable for use in dry cleaning. Another reservoir may be provided to store purified solvent that is separate from the reservoir that receives the debris contaminated solvent.

Dirty or contaminated solvent fluid is pumped from the solvent reservoir 10 by the filter pump 12 into the centrifugal separator 13. The centrifugal separator 13 is a mechanical centrifugal separator of conventional design and is used to separate coarse debris or residue, such as lint, dirt, and the like, from the contaminated solvent fluid.

The centrifugally filtered solvent passes from the centrifugal separator 13 through fluid line 14. The residual solvent laden with the separated coarse debris passes from the separator 13 through the flow line 15 into a distillation apparatus 20, known in the prior art. The residual solvent is distilled by conventional methods in the distillation apparatus 20 so that a flow of distilled solvent exits the apparatus through flow line 21.

The elements of the distillation apparatus are illustrated in FIG. 1a. Fluid enters from lines 15 and 42 (discussed herein) to an evaporator 23. As the solvent enters the evaporator, live steam from a steam boiler (not shown) is simultaneously directly injected into the evaporator to vaporize and admix with solvent. When the dry cleaning solvent solution includes a surfactant, a low foaming surfactant is used to prevent foaming and overflow from the evaporator. The evaporator may also include a circulation pump, not shown, to keep particles suspended and the temperature uniform during the evaporation process.

The vaporized solvent admixture is circulated through a mist impinger 24 to a condenser or heat exchanger 25. The distillate vapors are cooled in the condenser 25 and pumped through a coalescer and gravity separator 26, which can be of the type described in patents to Clay et al., U.S. Pat. No. 4,299,665, which is hereby incorporated by reference. The distilled solvent is discharged from the coalescer separator 26 through flow line 21. The distilled solvent can be redirected to the dry cleaning solvent reservoir 10 for reuse.

The coarse filtered solvent discharged from the centrifugal separator 13 through flow line 14 can be returned directly to the solvent reservoir for reuse. In the preferred embodiment, the coarse filtered solvent flows through line 14 into a fine debris filter 30 through an inlet 30a at the lower portion of the filter. The filter 30 includes a filtering element (FIG. 3) adapted for collecting fine debris in the contaminated solvent fluid. The fluid is forced upwards in the filter 30 and through the filter element to be discharged at the outlet 30b at the top of the filter. The filtered solvent flows through the one-way valve 31 along flow line 32 to be directed back into the dry cleaning solvent reservoir 10 for reuse, or into a separate purified solvent reservoir. The filter 30 also includes a check valve 33 to allow air into the chamber to facilitate draining.

Flow of the contaminated solvent through flow line 14 into the filter 30 is controlled by a valve 35, which is itself controlled by a valve controller 35a. When valve 35 is shut off, the fine debris contaminated solvent flows through the bypass line 37 around the filter 30. The bypass line 37 intersects with the flow line 32 so that the contaminated solvent leaving the centrifugal separator 13 is directed back into the dry cleaning solvent reservoir 10 without the fine filtering provided by the filter 30.

The closed or open state of the valve 35 is determined by the amount of debris built up on the filter element in filter 30. When too much debris has accumulated on the filtering surface of the filter 30, the backpressure along flow line 14 increases until it exceeds a predetermined limit. The pressure switch 39 is energized when that pressure limit is reached. When pressure switch 39 upstream of the valve 35 is energized, a signal is sent to valve controller 35a to close valve 35, causing the contaminated solvent to flow through the bypass line 37.

Concurrently, the pressure switch 39 sends a signal to energize the high pressure pump 40 in order to rinse the filter element of the accumulated debris. The high pressure pump 40 draws distilled solvent from the distillation apparatus 20 through the outlet line 21 and pump line 22, and pumps the distilled solvent through a spray nozzle (FIGS. 3 and 3a) at the base of the filter 30, as described in more detail herein. The distilled solvent spray impinges on the surface of the filter element within the filter 30 to dislodge the fine debris collected on the filter element.

The pressure switch 39 also sends a signal to valve controller 41a which controls the state of the valve 41. When the valve 41 is opened, the distilled solvent pumped by the high pressure pump 40 to clean the filter element flows through line 42 into the distillation apparatus 20. The fine debris dislodged from the filter element of the filter 30 is carried in suspension with the distilled solvent and is directed into the distillation apparatus 20 where it collects on the floor of the evaporator 23 (FIG. 1a) for later removal.

The pressure switch 39 is also operable on the valve controller 43a to open the valve 43 in the bypass line 37 to open it to the filtered solvent flow line 32. The one-way valve 31 in the flow line 32 prevents the fine debris contaminated solvent that bypasses the filter from entering the filter 30 through the top outlet opening 30b.

The filter rinsing process is brief and requires only a small volume of distilled solvent to dislodge the fine debris from the filter element of the filter 30. In the preferred embodiment, the high pressure pump 40 is a 7.5 Hp piston-type pump capable of pumping the distilled solvent through the spray nozzle at 450–600 psi and about 6 g.p.m. At this pressure, only about 2 gallons of fluid is required to completely rinse the filter element of the filter 30 in approximately 20 seconds, as compared to the 2–3 minute backwashing time required in prior art systems. It has been found that a spray pressure of less than 200 psi tends to be too low to adequately remove the fine debris from the filter element, while a pressure of 1,000 psi is too high because it tends to push the debris through the filter element, further clogging the element. Once the filter element has been completely rinsed, the valve controllers 35a and 41a are de-energized to open their respective valves 35 and 41. Valve 43 is closed to disconnect the bypass line 37 from the filtered solvent line 32.

Figure 2:
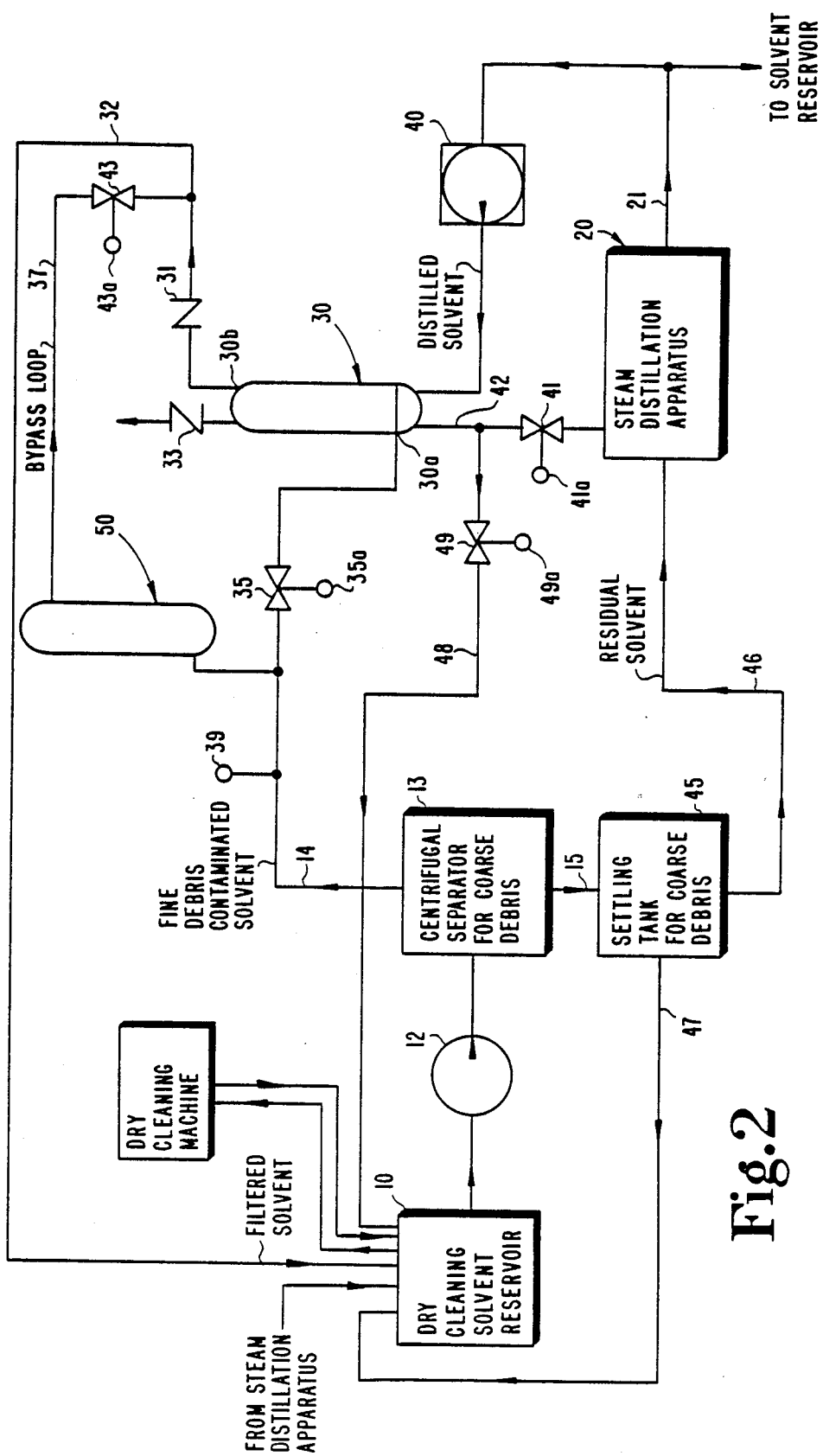
FIG. 2 is a diagram of a second system which embodies the invention.

In a second embodiment of the solvent reclamation system shown in FIG. 2, elements with feature numbers identical to feature numbers of FIG. 1 denote components that are identical to their counterpart in FIG. 1. Thus, the dry cleaning solvent reservoir 10 in FIG. 2 is identical to the dry cleaning solvent reservoir 10 in FIG. 1. However, the system illustrated in FIG. 2 is modified from the system of the previous embodiment in serveral respects.

The residual solvent passing from the centrifugal separator 13 through the flow line 15 flows into a settling tank 45 which is used to collect the coarse debris dispelled by the centrifugal separator 13. Most of the residual solvent passes through line 46 into the distillation apparatus 20 as described in the previous embodiment. An overflow solvent line 47 is provided at the top of the settling tank 45 to direct the excess residual solvent back into the dry cleaning solvent reservoir 10 without distillation.

In another aspect of the present embodiment, the rinsing solvent exiting the filter 30 through the flow line 42 follows a bifurcated flow path. One path flows through the valve 41 into the distillation apparatus 20 as previously described. However, an additional valve 49 and controller 49a are provided to control flow along line 48 from the rinsing solvent line 42 into the dry cleaning solvent reservoir 10. Using valves 41 and 49, the amount of solvent being returned for distillation can be controlled. Moreover, since the distilled solvent pumped by high pressure pump 40 into the filter 30 to clean the filter element will necessarily contain fine debris in a suspension, that suspension can be returned to the dry cleaning solvent reservoir 10 for passage through the filter 30 during the filtration sequence of the system.

In a third modification of this system, a second filter 50 is inserted into the bypass line 37. Thus, when the first filter 30 is clogged with debris, the pressure switch 39 causes valve 35 to close, thereby stopping the flow of contaminated solvent through the filter 30. Concurrently, the pressure switch activates controller 43a to open valve 43 to open the bypass line 37. In the bypass mode, the debris contaminated solvent will then pass through the bypass filter 50 so that the contaminated solvent is continually filtered for return to the reservoir 10. The bypass filter 50 can also be provided with a high pressure pump, such as pump 40, and a cleaning nozzle within the filter 50 to clean the filter element, in a manner similar to the first filter 30.

Referring now to FIG. 3, the construction of the filter of the preferred embodiment of this invention is illustrated. The filter 30 includes a canister 60 that is generally an elongated cylinder. The canister 60 includes a dome top 61 in which the filtered solvent outlet 30b and the air inlet 62 are formed. The filter 30 also includes a lower cap 65 that is also generally dome-shaped. The lower cap 65 includes the contaminated solvent inlet 30a and a distilled solvent inlet 66. The lower cap 65 is removably engaged with the canister 60 at the joint 67, by way of a key and slot configuration known in the prior art.

An angle iron 68 is mounted on the inner surface of the cap 65 and projects vertically upward into the interior of the canister 60. The angle iron 68 is used to vertically support the filter element 70 within the canister 60. The filter element 70 includes a perforated metal cylinder 71 having a number of perforations 71a spaced throughout the entire surface of the cylinder 71. A fine mesh screen 73 is mounted on the interior surface of the perforated metal cylinder 71 to provide a filtering surface for fine debris. Screen 73 is a TEFLON ® brand fluorinated-resin-coated, stainless-steel mesh. The TEFLON ® coating reduces the adherence between the debris and the filter screen so that the debris may be readily dislodged by a high-pressure spray. In the preferred embodiment, the screen 73 is capable of filtering particles as small as 5 microns.

In the filtration mode of the system, debris contaminated solvent enters the inlet 30a at the base of the filter 30 and flows upward through the interior of the filter element 70. The fluid passes through the screen 73 and through the aperture 71a and exists through the outlet 30b at the top of the canister 60. The perforated metal cylinder 71 provides radial support for the screen 73 when the filter element is subjected to fluid flow therethrough. In the filtration mode, the filter element 70 typically becomes clogged within 5-6 minutes so that the filter element must be rinsed frequently.

The canister 60 includes an internal circumferential flange 63 situated vertically above the end of the angle iron 68. The filter element 70 includes a sealing rim 75 at the open end of the perforated metal cylinder 71. The rim 75 abuts the internal flange 63 of the canister 60 to form a mechanical seal. In the filtration mode, fluid entering the filter 30 must flow through the filter element 70 before exiting the filter. A handle 76 is attached to the metal cylinder 71, preferably at the sealing rim 75, and extends downwardly toward the angle iron 68.

The handle 76 is seated on the top of the angle iron 68 so that the natural flexibility of the handle pushes the filter element 70 up and presses the sealing rim 75 against the internal flange 63 to keep a tight mechanical seal.

This filter arrangement of the present invention is different from the prior art systems in which the filter is lowered into the canister from above by using the handle. In the prior art arrangements, the rim of the filter rests upon the internal circumferential flange of the canister and the contaminated solvent flows through the filter from above so that the hydrodynamic pressure of the flowing fluid maintains a mechanical seal between the filter rim and the canister flange. In these prior art systems, high backwashing flow rates are required to dislodged debris from the upward facing surface filter element and carry the debris up to the contaminated solvent inlet at the top of the filter canister.

Engaged over the distilled solvent inlet 66 of the lower cap 65 is a tube 80 that projects into the interior of the canister 60. In the preferred embodiment, the tube curves upward over the angle iron 68 and handle 76 when the filter element 70 is in position, and opens upwardly at the center of the filter 30. Engaged at the open end of the tube 80 is a spray nozzle 81 for directing a spray upwardly into the interior of the filter element 70. Distilled solvent is pumped by the high pressure pump 40 through the inlet 66 and tube 80 to the nozzle 81. The high pressure fluid exits the nozzle 81 to impinge on the interior surface of the filter element 70, namely the screen 73 and metal cylinder 71, in order to dislodge debris collected thereon. In the filter rinse mode, the suspension of debris and distilled solvent can exit the filter through a separate opening in lower cap 65 (not shown in the FIG. 3) or through the inlet 30a in the lower cap, in which case actuation of the valves 35 and 41 is coordinated according to the filtration or filter rinse cycles.

The spray nozzle 81 provides a wide high-pressure spray that will impinge upon the entire interior surface of the filter element 70. In the preferred embodiment, the nozzle 81 is a 30-bronze, ⅜" NPT nozzle manufactured by Lechler, Inc., at 445 Kautz Road in St. Charles, Illinois, and sold under the model number 460-808-30BE. This nozzle 81 provides a 120° full cone spray through a conical spray outlet 82 (FIG. 3a). In the preferred embodiment, the spray nozzle 81 is designed to impart a rotational momentum to the high pressure fluid exiting the nozzle. The fluid entering the nozzle 81 from the tube 80 is directed by opposite angled sections 83a and 83b through corresponding openings 84a and 84b. The angled portions 83a and 83b impart rotational momentum to the solvent passing through the nozzle 81 to produce a helical conical spray. Thus, when the distilled solvent is pumped through the nozzle and sprayed into the interior of the filter element 70, the fluid has a tangential component that makes the high pressure spray more efficient at dislodging debris adhered to the filter screen 73.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In an industrial solvent recovery and filtering system having a supply of a debris contaminated solvent fluid, a distillation apparatus for producing a quantity of distilled solvent fluid, and a fluid flowpath between the supply and the distillation apparatus, the improvement comprising:
   a filtration path receiving at an inlet the debris contaminated solvent fluid from the supply and discharging at an outlet a filtered solvent fluid, said filtration path including;
   filtering means for removing the debris from the contaminated solvent fluid, said filtering means including a perforated filter element having a debris collection surface; and
   means for flowing the contaminated solvent fluid through said filter element in a first direction so that the debris in the solvent fluid is collected on said collection surface while the filtered solvent fluid passes through the perforations in said filter element; and
   filter cleaning means, separate from said filtration path, for cleaning said filter element without removing said filter element from the filtration path, said filter cleaning means including;
   a nozzle for directing a spray of rinsing under pressure against said collection surface of said filter element can be cleaned without backflow fluid pressure on said filter element; and
   means for removing debris dislodged from said filtering means.

2. The industrial solvent recovery and filtering system according to claim 1, wherein said collection surface includes a permanent non-stick coating to reduce the amount of adhesion of the debris on said collection surface.

3. The industrial solvent recovery and filtering system according to claim 2, wherein said permanent non-stick coating is fluorinated resin.

4. The industrial solvent recovery and filtering system according to claim 1, wherein said filter cleaning means includes means for providing said rinsing fluid spray at a pressure sufficient to dislodge the debris from said collection surface without forcing the debris into the perforations in said filter element.

5. The industrial solvent recovery and filtering system according to claim 1, wherein said means for removing the dislodged debris includes means for draining admixed rinsing fluid and dislodged debris from said filtering means from the collection surface side of said filter element.

6. The industrial solvent recovery and filtering system according to claim 1, wherein said nozzle includes means for producing a conical rinsing fluid spray.

7. The industrial solvent recovery and filtering system according to claim 6, wherein said conical rinsing fluid spray subtends an angle of 120° from said cleaning nozzle.

8. The industrial solvent recovery and filtering system according to claim 1, wherein said rinsing fluid is distilled solvent and said filter cleaning means includes means for pumping distilled solvent from the distillation apparatus to said nozzle.

9. The industrial solvent recovery and filtering system according to claim 1, wherein said filtration path is a loop from the supply in which the filtered solvent fluid is discharged to the supply.

10. The industrial solvent recovery and filtering system of claim 1, further comprising:
    means for automatically switching the system between a filtration cycle, in which said filter element is in fluid communication with said filtration path, and a filter cleaning cycle, in which said filter element if disconnected from said filtration path and said filter cleaning means is operable to clean said filter element, said automatic switching means operable in response to a change in fluid pressure in said filtration path upstream of said filter element.

11. The industrial solvent recovery and filtering system according to claim 10, further including a bypass path around said filter element to the outlet of said filtration path, wherein debris contaminated solvent fluid flows through said bypass path when the system is in said filter cleaning cycle.

12. The industrial solvent recovery and filtering system according to claim 11, wherein a second filtering means is interposed in said bypass path for removing debris from the contaminated solvent fluid flowing therethrough.

13. The industrial solvent recovery and filtering system according to claim 1, wherein:
    said perforated filter element includes a screen for filtering fine debris; and
    said filtering means includes coarse debris filtering means upstream of said perforated filter element in said filtration path, said coarse debris filtering means including;
    a centrifugal separator having an inlet in communication with the supply, a first outlet in communication with said perforated filter element, and a second outlet in communication with the distillation apparatus, wherein the debris contaminated solvent fluid enters said inlet, contaminated solvent fluid with its coarse debris content reduced is discharged at said first outlet, and centrifugally concentrated coarse debris is discharged at said second outlet.

* * * * *

UNITED STATES PATENT AND TRADEMARK OFFICE
CERTIFICATE OF CORRECTION

PATENT NO. : 4,954,222

DATED : September 4, 1990

INVENTOR(S) : Larry L. Durr et al.

It is certified that error appears in the above-identified patent and that said Letters Patent is hereby corrected as shown below:

In column 7, line 27, following the word "element" insert:

--in said first direction to dislodge debris, whereby said filter element--.

Column 7, line 25, after "rinsing" should be --fluid--.

Signed and Sealed this

Twenty-eighth Day of April, 1992

Attest:

HARRY F. MANBECK, JR.

Attesting Officer

Commissioner of Patents and Trademarks